(12) United States Patent
Choi et al.

(10) Patent No.: US 9,112,565 B2
(45) Date of Patent: Aug. 18, 2015

(54) USER EQUIPMENT AND METHOD FOR PRECODING FOR MIMO CODEBOOK-BASED BEAMFORMING USING AN AUTOCORRELATION MATRIX FOR REDUCED QUANTIZATION NOISE

(71) Applicant: Intel Corporation, Santa Clara, CA (US)

(72) Inventors: Yang-Seok Choi, Portland, OR (US); Shilpa Talwar, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/133,538

(22) Filed: Dec. 18, 2013

(65) Prior Publication Data

US 2015/0171949 A1    Jun. 18, 2015

(51) Int. Cl.
*H04L 1/02*     (2006.01)
*H04B 7/06*     (2006.01)
*H04B 7/04*     (2006.01)

(52) U.S. Cl.
CPC ............ *H04B 7/0639* (2013.01); *H04B 7/0482* (2013.01); *H04B 7/0626* (2013.01)

(58) Field of Classification Search
CPC ........ H04L 1/0618; G10L 19/10; G10L 25/90
USPC ................... 375/267, 147; 704/212, 216, 219
See application file for complete search history.

(56) References Cited

U.S. PATENT DOCUMENTS

| 7,103,101 B1* | 9/2006 | Davila ................. 375/240.18 |
| 7,236,538 B1* | 6/2007 | Banister ....................... 375/267 |
| 2003/0046066 A1* | 3/2003 | Kandhadai et al. ........... 704/216 |

\* cited by examiner

*Primary Examiner* — Khai Tran
(74) *Attorney, Agent, or Firm* — Schwegman Lundberg & Woessner, P.A.

(57) ABSTRACT

Embodiments of user equipment (UE) and methods for precoding for codebook based beamforming are generally described herein In some embodiments, an autocorrelation matrix is used to derive weight vectors for beamforming feedback resulting in a reduction in quantization noise.

9 Claims, 2 Drawing Sheets

USER EQUIPMENT AND METHOD FOR PRECODING FOR MIMO CODEBOOK-BASED BEAMFORMING USING AN AUTOCORRELATION MATRIX FOR REDUCED QUANTIZATION NOISE

TECHNICAL FIELD

Embodiments pertain to wireless communications. Some embodiments relate to multiple-input multiple output (MIMO) codebook beamforming in cellular networks, such as E-UTRAN networks operating in accordance with one of the 3GPP standards for the Long Term Evolution (LTE) (3GPP LTE).

BACKGROUND

Closed-loop MIMO systems typically transmit channel state information from a receiver to a transmitter over a feedback path. The channel state information may be used to employ beamforming to compensate for the current channel conditions increasing signal-to-noise (SNR) levels at the receiver. In some of these conventional systems, a beamforming matrix may be generated at the receiver based on the channel conditions. The beamforming matrix may then be provided to the transmitter as feedback. This feedback consumes bandwidth that might otherwise be available for data traffic. To reduce the overhead associated with this feedback, codewords of a known codebook may be provided instead of an actual beamforming matrix. The codewords may indicate which beamforming matrix is to be used by the transmitter.

In these systems, a receiver feeds back, among other things, precoding information, to a transmitter that recommends a precoder for use in transmitting beamformed signals back to the receiver. Since the selection of precoders is limited to particular codebooks, the recommended precoder may not be ideal based on the current channel conditions. Multi-user (MU) MU-MIMO and coordinated multi-point (CoMP) transmissions are particularly sensitive to this quantization error for a given codebook. Although this quantization error may be reduced through the use of a larger codebook, recommending a precoder associated with a larger codebook would require significant additional feedback as well as defining a larger codebook.

Thus, what are needed are user equipment (UE) and methods for precoding that reduce quantization error without the use of larger codebook. What are also needed are user equipment and methods for precoding that reduce quantization error suitable for MU-MIMO and CoMP in LTE networks.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
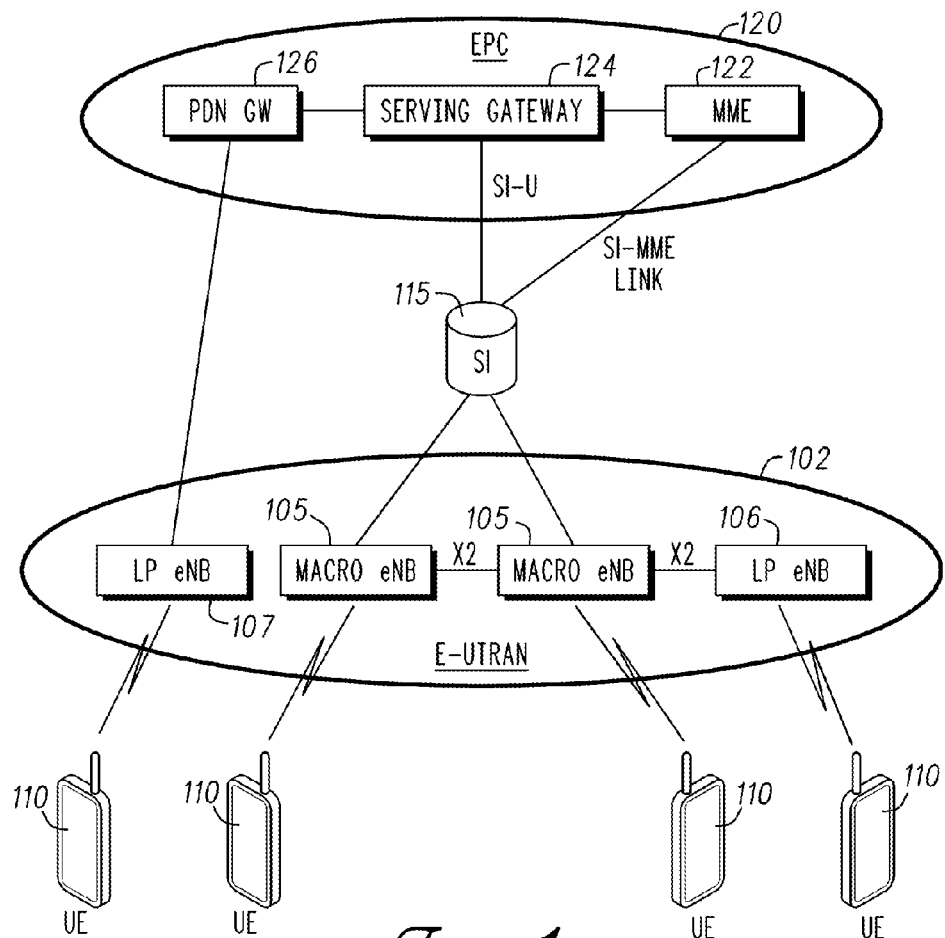
FIG. 1 shows a portion of an end-to-end network architecture of LTE (long term evolution) network with various components of the network in accordance with some embodiments.

FIG. 1 shows a portion of an end-to-end network architecture of LTE (long term evolution) network with various components of the network. The network comprises a radio access network (e.g., as depicted, the E-UTRAN or evolved universal terrestrial radio access network) 102 and the core network (EPC) 120 coupled together through an S1 interface 115. (Note that for convenience and brevity sake, only a portion of the core network, as well as the RAN, is shown.

The core (EPC) 120 includes mobility management entity (MME) 122, serving gateway (serving GW) 124, and packet data network gateway (PDN GW) 126. The RAN 102 includes macro base stations (also referred to as macro eNodeB or eNB) 105, low power (LP) base stations (or LP eNBs) 106, 107, and UEs (user equipment or mobile terminals) 110.

In accordance with embodiments, a UE 110 may be arranged to perform linear precoding for MIMO codebook based beamforming. In these embodiments, the UE may use an auto-correlation matrix to derive weight vectors for feedback to an eNB. This may result in a reduction in quantization noise. These embodiments are described in more detail below.

The MME is similar in function to the control plane of legacy Serving GPRS Support Nodes (SGSN). It manages mobility aspects in access such as gateway selection and tracking area list management. The serving GW 124 terminates the interface toward the RAN, and routes data packets between the RAN and core network. In addition, it may be a local mobility anchor point for inter-eNode-B handovers and also may provide an anchor for inter-3GPP mobility. Other responsibilities may include lawful intercept, charging, and some policy enforcement. The Serving GW and the MME may be implemented in one physical node or separate physical nodes. The PDN GW terminates an SGi interface toward the packet data network (PDN). It routes data packets between the EPC and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW and the Serving GW may be implemented in one physical node or separated physical nodes.

The eNode-B (macro and micro) terminates the air interface protocol and is usually (if not always) the first point of contact for a UE 110. In some embodiments, an eNode-B may fulfill various logical functions for the RAN including but not limited to RNC (radio network controller functions) such as radio bearer management, uplink and downlink dynamic radio resource management and data packet scheduling, and mobility management.

The S1 interface is the interface that separates the RAN and the EPC. It is split into two parts: the S1-U, which carries traffic data between the eNode-B and the Serving GW, and the S1-MME, which is a signaling interface between the eNode-B and the MME. The X2 interface is the interface between eNode-Bs (at least between most, as will be addressed below regarding micro eNBs). The X2 interface comprises two parts, the X2-C and X2-U. The X2-C is the control plane interface between eNode-Bs, while the X2-U is the user plane interface between eNode-Bs.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNode-B for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, LP eNB 107 might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB 106 could be implemented with a picocell eNB since it is coupled to a macro eNB via an X2 interface. Picocell eNBs Or other LP eNBs for that matter) may incorporate some or all functionality of a macro eNB. In some cases, this may be referred to as an access point base station or enterprise femtocell.

Figure 2:
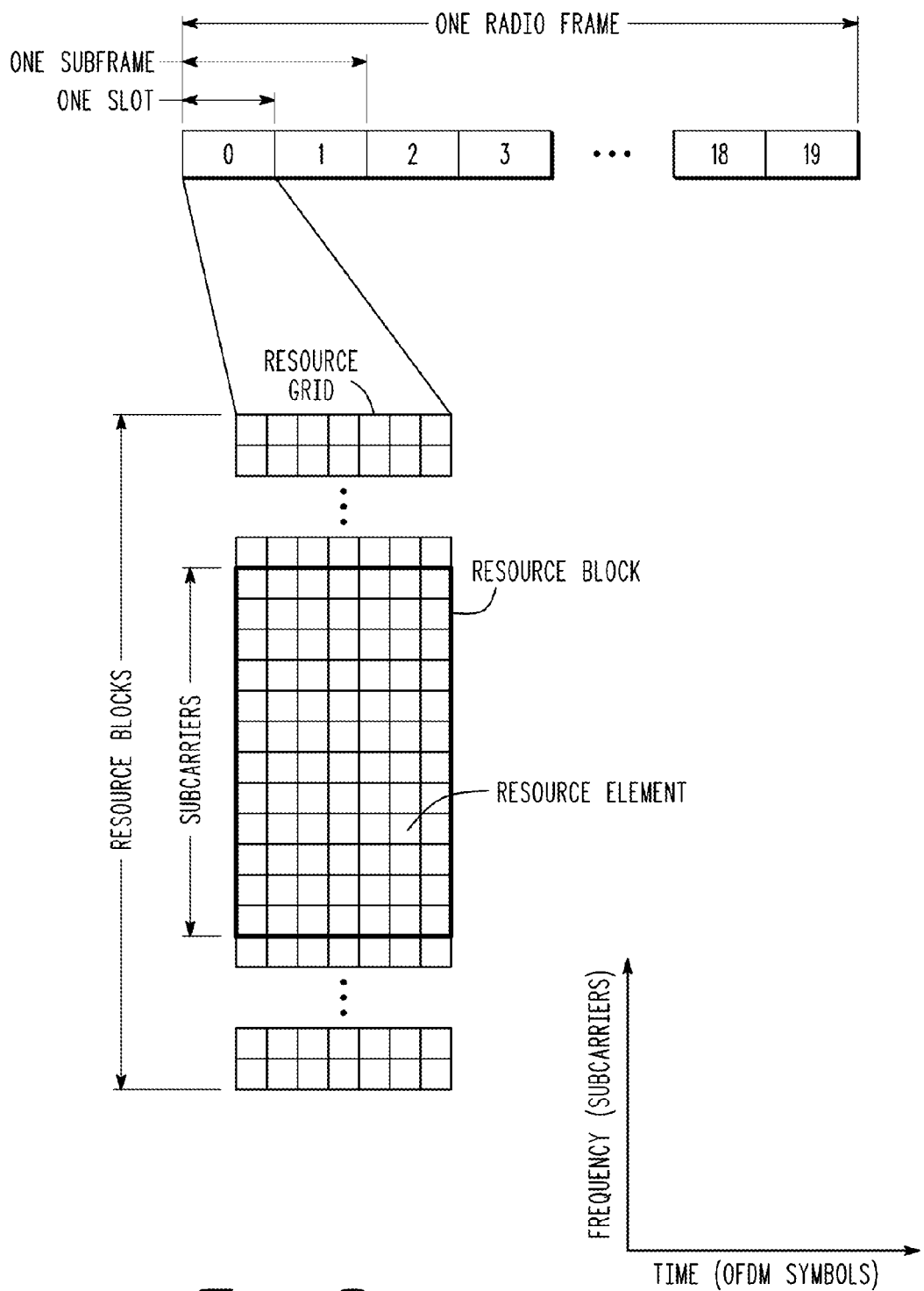
FIG. 2 shows a structure for the downlink resource grid for downlink transmissions from an enhanced node B (eNB) to a UE.

FIG. 2 shows a structure for the downlink resource grid for downlink transmissions from an eNB to a UE. The depicted grid illustrates a time-frequency grid, called a resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain, this represents the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 110 (FIG. 1). The physical downlink control channel (PDCCH) carries information about the transport format and resource allocations related to the PDSCH channel, among other things. It also informs the UE about the transport format, resource allocation, and H-ARQ information related to the uplink shared channel. Typically, downlink scheduling (assigning control and shared channel resource blocks to UEs within a cell) is performed at the eNB based on channel quality information fed back from the UEs to the eNB, and then the downlink resource assignment information is sent to a UE on the control channel (PDCCH) used for (assigned to) the UE.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L,=1, 2, 4, or 8).

In closed loop MIMO, such as MU-MIMO and CoMP, the channel vector is quantized by predefined codebook. Typically, Zero-Forcing (ZF) precoding may be used to reduce inter-user interferences. Conventionally, there has been no attempt to reduce the quantization impact. Embodiments disclosed herein provide an improved linear precoding method which reduces the effect of quantization noise without requiring a change of codebook.

Conventionally, the quantization noise is not taken into account for the derivation of ZF or MMSE. In accordance with embodiments, instead of using the codebook in precoding, a corresponding autocorrelation matrix may be used in deriving weight vectors in a sense that minimize the quantization noise effect.

Multiple cooperative transmitters and non-cooperative receivers, such as CoMP among multiple cells and MU-MIMO, are considered within a cell. Assume N×K channel matrix $H=[h_1 \; h_2 \; \ldots \; h_N]^T$. The received signal with K×K precoding matrix W may be expressed as:

$$y = HWd + n$$

where d is K×1 data vector and n represents noise. 3GPP specified codebook for the limited feedback as $C = \{c_1 \; c_2 \; \ldots \; c_M\}$.

Quantization: For channel vector $h_n$, choose codebook index $i_n$ which yields codebook vector closer to $h_n$ as following:

$$\hat{h}_n \equiv Q(h_n) = c_{i_n} \quad (1)$$

where $$i_n = \underset{m}{\operatorname{argmin}} |h_n^H c_m|^2.$$

For ZF precoding, the weight matrix is given by $W = g\hat{H}(\hat{H}\hat{H}^H)^{-1}$ where g is a normalization coefficient. The composite channel HW is not a diagonal matrix due to quantization inherent in the codebook. Thus, inter-user interference is unavoidable for conventional ZF precoding.

In accordance with some embodiments, a set of channel vectors is first defined which yield m-th codebook vector:

$$S_m = \{h | Q(h) = c_m\}. \quad (2)$$

An autocorrelation matrix corresponding to m-th codebook vector may be defined as follows:

$$R_m = \underset{h \in S_m}{E} \{hh^H\}. \quad (3)$$

Instead of maximizing received SIR which is intractable mathematically, embodiments disclosed herein may maximize SIR from transmit point of view which is defined as:

$$SIRtx_n = \frac{E\{|h_n^T w_n|^2\}}{\sum_{k \neq n} E\{|h_k^T w_n|^2\}} = \frac{w_n^H R_{i_n} w_n}{\sum_{k \neq n} w_n^H R_{i_k} w_n}$$

where $w_n$ is n-th column vector of W. In order to avoid noise enhancement, noise power ($\sigma^2$) may be added by defining SINRtx as follows:

$$SIRtx_n = \frac{w_n^H R_{i_n} w_n}{\sum_{k \neq n} w_n^H R_{i_k} w_n + \sigma^2} = \frac{w_n^H R_{i_n} w_n}{w_n^H \left( \sum_{k \neq n} R_{i_k} + \frac{\sigma^2}{c} I \right) w_n}$$

where $c = w_n^H w_n$.
By definition $$\bar{R}_{i_n} \equiv \sum_{k \neq n} R_{i_k} + \frac{\sigma^2}{c} I,$$

we have $$SINRtx_n = \frac{w_n^H R_{i_n} w_n}{w_n^H \bar{R}_{i_n} w_n}.$$

By applying a whitening filter $w_n = \bar{R}_{i_n}^{-1/2} \tilde{w}_n$, the SIR becomes $$SIRtx_n = \frac{\tilde{w}_n^H (\bar{R}_{i_n}^{1/2})^H R_{i_n} \bar{R}_{i_n}^{1/2} \tilde{w}_n}{\tilde{w}_n^H \tilde{w}_n}.$$

The SNR may be maximized when:

$\tilde{w}_n$=Principal eigenvector of $(\bar{R}_{i_n}^{-1/2})^H R_{i_n} \bar{R}_{i_n}^{-1/2}$.

Thus, $w_n = \bar{R}_{i_n}^{-1/2} v_n$ will maximize the SIR where:

$v_n$=Principal eigenvector of $(\bar{R}_{i_n}^{-1/2})^H R_{i_n} \bar{R}_{i_n}^{-1/2}$.

As can be seen above, given any codebook design, the autocorrelation matrix can be pre-calculated using the quantization described by equation (1) and the set $S_m$ in equation (2). Embodiments disclosed herein do not need any change to existing LTE specifications (e.g., the same codebook may be used). The closed form expression for optimum value of parameter c may be derived by simulations, although this is not a requirement.

In accordance with some embodiments, an autocorrelation matrix based quantization is provided as follows:

$$\hat{h}_n \equiv Q_2(h_n) c_{i_n} \text{ where } i_n = \arg\min_k |h_n^H R_k h_n|^2.$$

When the UE 110 (FIG. 1) performs this autocorrelation matrix based quantization technique, additional gain is observed although the autocorrelation matrix $R_k$ is obtained from the quantization method (1) and the set $S_k$ (2).

In some embodiments, a normalization of weight vectors is performed so that maximum transmit power per antenna is regulated as follows:

$$W = W / \sqrt{\max diag(WW^H)}.$$

This normalization may be a more practical assumption as power amplifier per Tx antenna is fixed. For comparison purpose we also simulate MMSE precoding as follows:

$$W = g\hat{H}^H (\hat{H}\hat{H}^H + \sigma^2 I)^{-1}.$$

Table 1 shows the gain over ZF in mean of sum capacity in a 4×4 MIMO system.

TABLE 1

Gains over ZF in mean capacity

| | Conventional ZF precoding | Conventional MMSE precoding | Autocorrelation based precoding in accordance with some embodiments |
|---|---|---|---|
| SNR = 0 dB | 1 | 2.104 | 2.160 |
| SNR = 20 dB | 1 | 1.048 | 1.389 |
| SNR = 30 dB | 1 | 1.005 | 1.351 |

Figure 3:
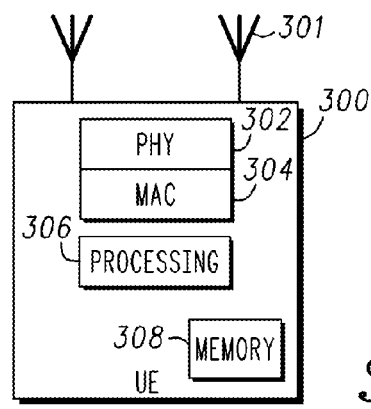
FIG. 3 illustrates a UE in accordance with some embodiments.

FIG. 3 illustrates a functional block diagram of a UE in accordance with some embodiments. UE 300 may be suitable for use as UE 110 (FIG. 1). The UE 300 may include physical layer circuitry 302 for transmitting and receiving signals to and from eNBs 105 and 106 (FIG. 1) using one or more antennas 301. UE 300 may also include medium access control layer (MAC) circuitry 304 for controlling access to the wireless medium. UE 300 may also include processing circuitry 306 and memory 308 arranged to perform the operations for autocorrelation based precoding described herein.

In accordance with some embodiments, UE 300 is arranged to perform linear precoding for MIMO codebook based beamforming. In these embodiments, the UE may use an auto-correlation matrix to derive weight vectors for feedback. This autocorrelation matrix based quantization technique may result in a reduction in quantization noise.

In some embodiments, the UE 300 may perform a linear precoding method to reduce the effect of quantization noise. The method may include generating an autocorrelation matrix from codebook vectors of a predefined codebook, and deriving weight vectors for feedback from the autocorrelation matrix for codebook based beamforming. In these embodiments, the autocorrelation matrix corresponding to the codebook is used to derive weight vectors, reducing the effects of quantization that are generally associated with conventional codebook quantization techniques.

In some embodiments, the UE 300 may be arranged to operate in a 3GPP LTE network and may be arranged for providing quantized channel feedback in the form of a weight matrix for one of coordinated multipoint (CoMP), multi-user multiple-input multiple output (MU-MIMO) or closed loop MIMO operation.

In some embodiments, the UE 300 may also determine a set of channel vectors (Sm) which yield a corresponding codebook vector (Cm) of the predefined codebook, determine the autocorrelation matrix (Rm) corresponding to the codebook vector (Cm), maximize a transmit signal-to-interference ratio (SIRtxn) (i.e., not the received SIR) for the autocorrelation matrix including adding noise power ($\sigma^2$) and applying a whitening filter, and perform an autocorrelation based quantization of vectors of a received channel matrix (hn) using the autocorrelation matrix to yield codebook vectors of the codebook.

In some embodiments, the UE 300 may also generate the weight vectors (wn) of a weight matrix (W) based on the codebook vectors and may transmit a weight matrix to an enhanced Node B (eNB) as part of channel state information (CSI) feedback.

In some embodiments, the UE 300 may be arranged to provide quantized channel feedback in the form of a weight matrix. In these embodiments, the UE 300 may be arranged to: determine a set of channel vectors (Sm) which yield a corresponding codebook vector (Cm) of a predefined codebook; determine an autocorrelation matrix (Rm) corresponding to the codebook vector (Cm); maximize a transmit signal-to-interference ratio (SIRtxn) (i.e., not the received SIR) for the autocorrelation matrix including adding noise power ($\sigma^2$) and applying a whitening filter; and perform an autocorrelation based quantization of vectors of a received channel matrix (hn) using the autocorrelation matrix to yield codebook vectors of the codebook. In these embodiments, the weight matrix may be for a coordinated multipoint (CoMP), multi-user multiple-input multiple output (MU-MIMO) or closed loop MIMO channel.

In some embodiments, the UE 300 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 300 may include one or more of a keyboard, a display, a non-volatile memory port, multiple antennas, a graphics processor, an application processor, speakers, and other mobile device elements. The display may be an LCD screen including a touch screen.

The one or more antennas 301 utilized by the UE 300 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to $\frac{1}{10}$ of a wavelength or more.

Although the UE 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the UE 300 may be configured to receive OFDM communication signals over a multicarrier communication channel in accordance with an OFDMA communication technique. The OFDM signals may comprise a plurality of orthogonal subcarriers. In these broadband multicarrier embodiments, the UE 300 and the eNBs may be configured to communicate in accordance with an orthogonal frequency division multiple access (OFDMA) technique.

In some LTE embodiments, the basic unit of the wireless resource is the Physical Resource Block (PRB). The PRB may comprise 12 sub-carriers in the frequency domain×0.5 ms in the time domain. The PRBs may be allocated in pairs (in the time domain). In these embodiments, the PRB may comprise a plurality of resource elements (REs). A RE may comprise one sub-carrier×one symbol.

Two types of reference signals may be transmitted by an eNB including demodulation reference signals (DM-RS), channel state information reference signals (CIS-RS) and/or a common reference signal (CRS). The DM-RS may be used by the UE for data demodulation. The reference signals may be transmitted in predetermined PRBs.

In some embodiments, the OFDMA technique may be either a frequency domain duplexing (FDD) technique that uses different uplink and downlink spectrum or a time-domain duplexing (TDD) technique that uses the same spectrum for uplink and downlink.

In some other embodiments, the UE 300 and the eNBs may be configured to communicate signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some LTE embodiments, the UE 300 may calculate several different feedback values which may be used to perform channel adaption for closed-loop spatial multiplexing transmission mode. These feedback values may include a channel-quality indicator (CQI), a rank indicator (RI) and a precoding matrix indicator (PMI). By the CQI, the transmitter selects one of several modulation alphabets and code rate combinations. The RI informs the transmitter about the number of useful transmission layers for the current MIMO channel, and the PMI indicates the codebook index of the precoding matrix (depending on the number of transmit antennas) that is applied at the transmitter. The code rate used by the eNB may be based on the CQI. The PMI may be a vector that is calculated by the UE and reported to the eNB. In some embodiments, the UE may transmit a physical uplink control channel (PUCCH) of format 2, 2a or 2b containing the CQI/PMI or RI.

In these embodiments, the CQI may be an indication of the downlink mobile radio channel quality as experienced by the UE 300. The CQI allows the UE 300 to propose to an eNB an optimum modulation scheme and coding rate to use for a given radio link quality so that the resulting transport block error rate would not exceed a certain value, such as 10%. In some embodiments, the UE may report a wideband CQI value which refers to the channel quality of the system bandwidth. The UE may also report a sub-band CQI value per sub-band of a certain number of resource blocks which may be configured by higher layers. The full set of sub-bands may cover the system bandwidth. In case of spatial multiplexing, a CQI per code word may be reported.

In some embodiments, the PMI may indicate an optimum precoding matrix to be used by the eNB for a given radio condition. The PMI value refers to the codebook table. The network configures the number of resource blocks that are represented by a PMI report. In some embodiments, to cover the system bandwidth, multiple PMI reports may be provided. PMI reports may also be provided for closed loop spatial multiplexing, multi-user MIMO and closed-loop rank 1 precoding MIMO modes.

In some cooperating multipoint (CoMP) embodiments, the network may be configured for joint transmissions to a UE in which two or more cooperating/coordinating points, such as remote-radio heads (RRHs) transmit jointly. In these embodiments, the joint transmissions may be MIMO transmissions and the cooperating points are configured to perform joint beamforming.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A linear precoding method to reduce the effect of quantization noise performed by user equipment (UE) in a 3GPP LTE network for providing quantized channel feedback in the form of a weight matrix for one of coordinated multipoint (CoMP), multi-user multiple-input multiple output (MU-MIMO) or closed loop MIMO operation, the method comprising:
generating an autocorrelation matrix from codebook vectors of a predefined codebook; and
deriving weight vectors for feedback from the autocorrelation matrix for codebook based beamforming.

2. The method of claim 1 further comprising:
determining a set of channel vectors (Sm) which yield a corresponding codebook vector (Cm) of the predefined codebook;
determining the autocorrelation matrix (Rm) corresponding to the codebook vector (Cm);
maximizing a transmit signal-to-interference ratio (SIRtxn) (i.e., not the received SIR) for the autocorrelation matrix including adding noise power ($\sigma^2$) and applying a whitening filter; and
performing an autocorrelation based quantization of vectors of a received channel matrix (hn) using the autocorrelation matrix to yield codebook vectors of the codebook.

3. The method of claim 2 further comprising:
generating the weight vectors (wn) of a weight matrix (W) based on the codebook vectors; and
transmitting a weight matrix to an enhanced Node B (eNB) as part of channel state information (CSI) feedback.

4. A method performed by user equipment (UE) in a 3GPP LTE network for providing quantized channel feedback in the form of a weight matrix, the method comprising:

determining a set of channel vectors (Sm) which yield a corresponding codebook vector (Cm) of a predefined codebook;
determining an autocorrelation matrix (Rm) corresponding to the codebook vector (Cm);
maximizing a transmit signal-to-interference ratio (SIRtxn) for the autocorrelation matrix including adding noise power ($\sigma^2$) and applying a whitening filter; and
performing an autocorrelation based quantization of vectors of a received channel matrix (hn) using the autocorrelation matrix to yield codebook vectors of the codebook.

5. The method of claim 4 wherein the weight matrix is for one of a coordinated multipoint (CoMP), multi-user multiple-input multiple output (MU-MIMO) or closed loop MIMO channel.

6. User equipment (UE) comprising processing circuitry and physical-layer circuitry (PHY), the processing circuitry arranged to:
generate using an autocorrelation matrix from codebook vectors of a predefined codebook; and
derive weight vectors for feedback from the autocorrelation matrix for codebook based beamforming,
wherein the UE is arranged to operate in a 3GPP LTE network, and
wherein the PHY is arranged to transmit quantized channel feedback in the form of a weight matrix for one of coordinated multipoint (CoMP), multi-user multiple-input multiple output (MU-MIMO) or closed loop MIMO operation.

7. The UE of claim 6 wherein the processing circuitry is further arranged to:
determine a set of channel vectors (Sm) which yield a corresponding codebook vector (Cm) of the predefined codebook;
determine the autocorrelation matrix (Rm) corresponding to the codebook vector (Cm);
maximize a transmit signal-to-interference ratio (SIRtxn) for the autocorrelation matrix including adding noise power ($\sigma^2$) and applying a whitening filter; and
perform an autocorrelation based quantization of vectors of a received channel matrix (hn) using the autocorrelation matrix to yield codebook vectors of the codebook.

8. The UE of claim 7 wherein the processing circuitry is further arranged to generate the weight vectors (wn) of a weight matrix (W) based on the codebook vectors, and wherein the PHY is arranged to transmit a weight matrix to an enhanced Node B (eNB) as part of channel state information (CSI) feedback.

9. A non-transitory computer-readable storage medium that stores instructions for execution by one or more processors of User equipment (UE) to configure the UE to perform operations to:
generate using an autocorrelation matrix from codebook vectors of a predefined codebook; and
derive weight vectors for feedback from the autocorrelation matrix for codebook based beamforming,
wherein the UE is arranged to operate in a 3GPP LTE network and the one or more processors are arranged to configure the UE to transmit quantized channel feedback in the form of a weight matrix for one of coordinated multipoint (CoMP), multi-user multiple-input multiple output (MU-MIMO) or closed loop MIMO operation.

* * * * *